(12) United States Patent
Jiang et al.

(10) Patent No.: US 8,602,765 B2
(45) Date of Patent: Dec. 10, 2013

(54) CARBON NANOTUBE YARN, METHOD AND APPARATUS FOR MAKING THE SAME

(75) Inventors: Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 1041 days.

(21) Appl. No.: 12/592,882

(22) Filed: Dec. 3, 2009

(65) Prior Publication Data

US 2010/0173037 A1    Jul. 8, 2010

Related U.S. Application Data

(63) Continuation of application No. 11/586,976, filed on Oct. 26, 2006, now Pat. No. 7,704,480.

(30) Foreign Application Priority Data

Dec. 16, 2005  (CN) .......................... 2005 1 0120716

(51) Int. Cl.
*D01F 9/12* (2006.01)

(52) U.S. Cl.
USPC ...... 425/223; 19/66 R; 423/447.1; 423/447.3; 428/367

(58) Field of Classification Search
USPC ........ 423/447.1–447.3, 445 B; 977/742–754, 977/842–848; 425/223; 19/66 R
See application file for complete search history.

(56) References Cited

U.S. PATENT DOCUMENTS

2008/0170982 A1*   7/2008   Zhang et al. ............... 423/447.3

FOREIGN PATENT DOCUMENTS

WO   WO2004052489   6/2004

* cited by examiner

*Primary Examiner* — Daniel C McCracken
(74) *Attorney, Agent, or Firm* — Altis Law Group, Inc.

(57) ABSTRACT

An apparatus for making a carbon nanotube yarn includes a tube and a bobbin. The tube has an opening capable of introducing organic solvent into the tube. The tube further has an inlet and an outlet defined through lateral walls thereof. The inlet is capable of accepting one or more carbon nanotube yarn strings and the outlet is capable of accepting the carbon nanotube yarn. The bobbin is positioned around the tube for collecting the carbon nanotube yarn as it comes out of the outlet.

8 Claims, 7 Drawing Sheets

US 8,602,765 B2

CARBON NANOTUBE YARN, METHOD AND APPARATUS FOR MAKING THE SAME

RELATED APPLICATIONS

This application is a continuation application of patent application Ser. No. 11/586,976 filed on Oct. 26, 2006 from which it claims the benefit of priority under 35 U.S.C. 120. Both, this application and the patent application Ser. No. 11/586,976 claim the benefit of priority under 35 USC 119 from Chinese Patent Application 200510120716.6, filed on Dec. 16, 2005.

BACKGROUND

1. Technical Field

The disclosure relates generally to nanotubes, and more particularly to a carbon nanotube yarn and method for making the same.

2. Discussion of Related Art

Carbon nanotubes are tubules of carbon generally having a length of 5 to 100 micrometers and a diameter of 5 to 100 nanometers. Carbon nanotubes can be composed of a number of co-axial cylinders of graphite sheets and have recently attracted a great deal of attention for use in different fields such as field emitters, gas storage and separation, chemical sensors and high strength composites. However, carbon nanotubes are almost never used in microscopic applications at present as it is very difficult to manipulate the carbon nanotubes as a microscopic level. So, assembling carbon nanotubes into macroscopic structures is of great importance to their applications at the macroscopic level.

That a long macroscopic carbon nanotube yarn can be drawn out from a super-aligned carbon nanotube array has been disclosed in U.S. Pat. No. 7,045,108. The carbon nanotube yarn includes a plurality of carbon nanotube bundles that are joined end to end by van der Waals attractive force, and each of the carbon nanotube bundles includes a plurality of carbon nanotubes substantially parallel to each other. Referring to FIG. 7, a simple model of a continued carbon nanotube yarn 14 being drawn out from a super-aligned carbon nanotube array 10 is shown. A number of carbon nanotube bundles 12 are joined end to end by van der Waals attractive force to form the continued carbon nanotube yarn 14. However, in general, the carbon nanotube yarn 14 is several centimeters in length and several microns in thickness. A ratio of surface area to volume of the carbon nanotube yarn 14 is very great, and the surface of it is very clean, so it is very sticky and as such macroscopic level application of the carbon nanotube yarn 14 is restricted to a great extent.

That a long macroscopic carbon nanotube yarn can be drawn out from a super-aligned carbon nanotube array has been disclosed in U.S. Pat. No. 7,045,108. The carbon nanotube yarn includes a plurality of carbon nanotube bundles that are joined end to end by van der Waals attractive force, and each of the carbon nanotube bundles includes a plurality of carbon nanotubes substantially parallel to each other. Referring to FIG. 7, a simple model of a continued carbon nanotube yarn 14 being drawn out from a super-aligned carbon nanotube array 10 is shown. A number of carbon nanotube bundles 12 are joined end to end by van der Waals attractive force to form the continued carbon nanotube yarn 14. However, in general, the carbon nanotube yarn 14 is several centimeters in length and several microns in thickness. A ratio of surface area to volume of the carbon nanotube yarn 14 is very great, and the surface of it is very clean, so it is very sticky and as such macroscopic level application of the carbon nanotube yarn 14 is restricted to a great extent.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments.

Figure 1:
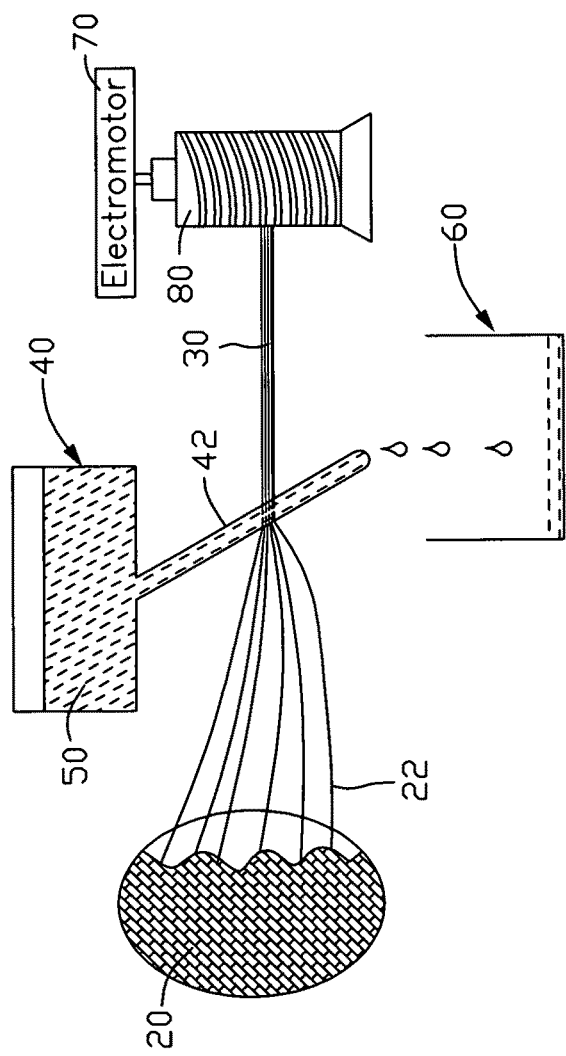
FIG. 1 is a schematic view of a device for making a carbon nanotube yarn in accordance with a preferred embodiment of the present invention.

Corresponding reference characters indicate corresponding parts throughout the several views. The exemplifications set out herein illustrate at least one preferred embodiment of the disclosure, in one form, and such exemplifications are not to be construed as limiting the scope of the disclosure in any manner.

DETAILED DESCRIPTION

Reference will now be made to the drawings to describe embodiments of the present apparatus and method for making an array of carbon nanotubes, in detail.

Referring to FIG. 1, a method for making carbon nanotube yarn includes the steps of:

(1) providing a carbon nanotube array 20;

(2) drawing out a number of carbon nanotube yarn strings 22 from the carbon nanotube array 20;

(3) treating the number of carbon nanotube yarn strings 22 using an organic solvent 50 in a manner such that the number of carbon nanotube yarn strings 22 are formed into a single strand of carbon nanotube yarn 30.

In the step (1), the carbon nanotube array 20 is generally a super-aligned carbon nanotube array. The carbon nanotube array 20 can be manufactured using a chemical vapor deposition method. The method is disclosed in U.S. Pat. No. 7,045,108, which is incorporated herein by reference. For illustrative purposes, the method for manufacturing the carbon nanotube array 20 is described below, and includes the steps of:

(a) providing a substantially flat and smooth substrate, the substrate can be a p-type or n-type silicon wafer;

(b) depositing a catalyst on the substrate, the catalyst being selected from the group consisting of iron, cobalt, nickel or alloys of the same;

(c) annealing the substrate with the catalyst in protective gas at 300~400° C. for about 10 hours;

(d) heating the annealed substrate with the catalyst to 500~700° C., supplying a mixture of carbon containing gas and protective gas, controlling a difference between the local temperature of the catalyst and the environmental temperature to be at least 50° C., controlling a partial pressure of the carbon containing gas to be less than 0.2, and growing a number of carbon nanotubes on the substrate after 5~30 minutes such that the carbon nanotube array 20 is formed on the substrate. The carbon containing gas can be a hydrocarbon such as acetylene, ethane etc. The protective gas can be an inert gas or nitrogen gas.

The superficial density of the carbon nanotube array 20 manufactured by above-described process with carbon nanotube bundles being compactly bundled up together is higher. The van der Waals attractive force between adjacent carbon nanotube bundles is strong, and diameters of the carbon nanotubes are correspondingly substantial.

Figure 2:
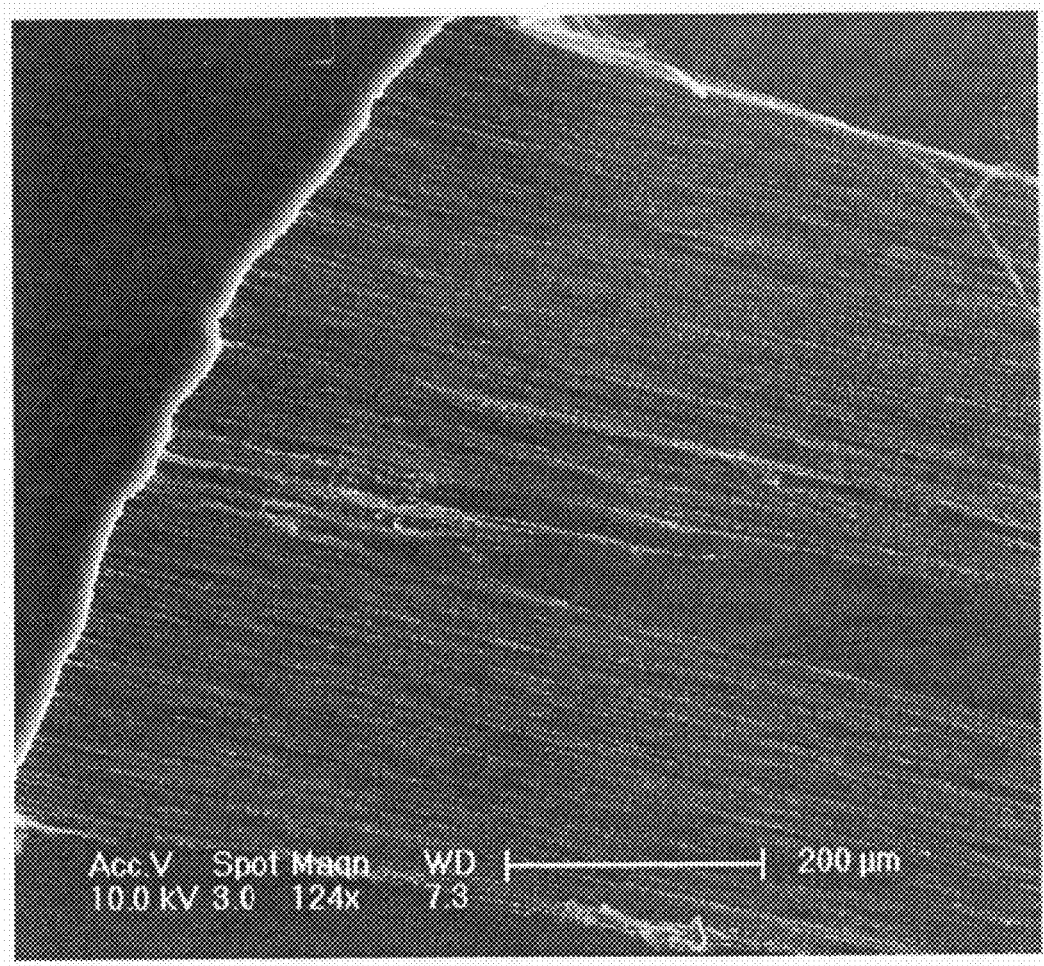
FIG. 2 is a scan electronic microscopy (SEM) photograph of a carbon nanotube yarn string.

In the step (2), the carbon nanotube yarn strings 22 may be drawn out from the carbon nanotube array 20 with a tool with a sharp tip, such as a tweezers. Specifically, an initial carbon nanotube bundle with a number of carbon nanotubes of the carbon nanotube array 20 can be drawn out with tweezers. As a carbon nanotube bundle is drawn out, other carbon nanotube bundles are also drawn out due to the van der Waals attractive force between ends of adjacent bundles and a successive carbon nanotube yarn string 22 is formed. The carbon nanotube yarn string 22 may have a length of several centimeters and a thickness of several microns. Referring to FIG. 2, a SEM photograph of the carbon nanotube yarn string 22 of the present embodiment is shown. In the present embodiment, a number of carbon nanotube yarn string 22 are drawn out from the carbon nanotube array 20.

Figure 3:
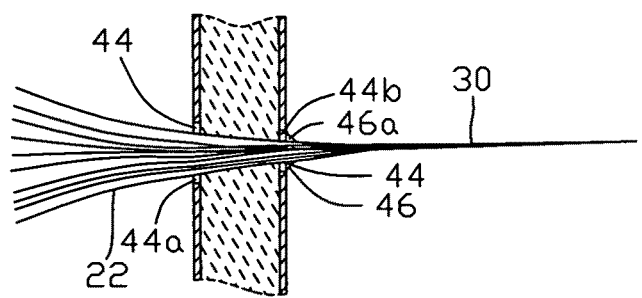
FIG. 3 is an enlarged sectional view of a tube with a through hole of the device of FIG. 1.
Figure 6:
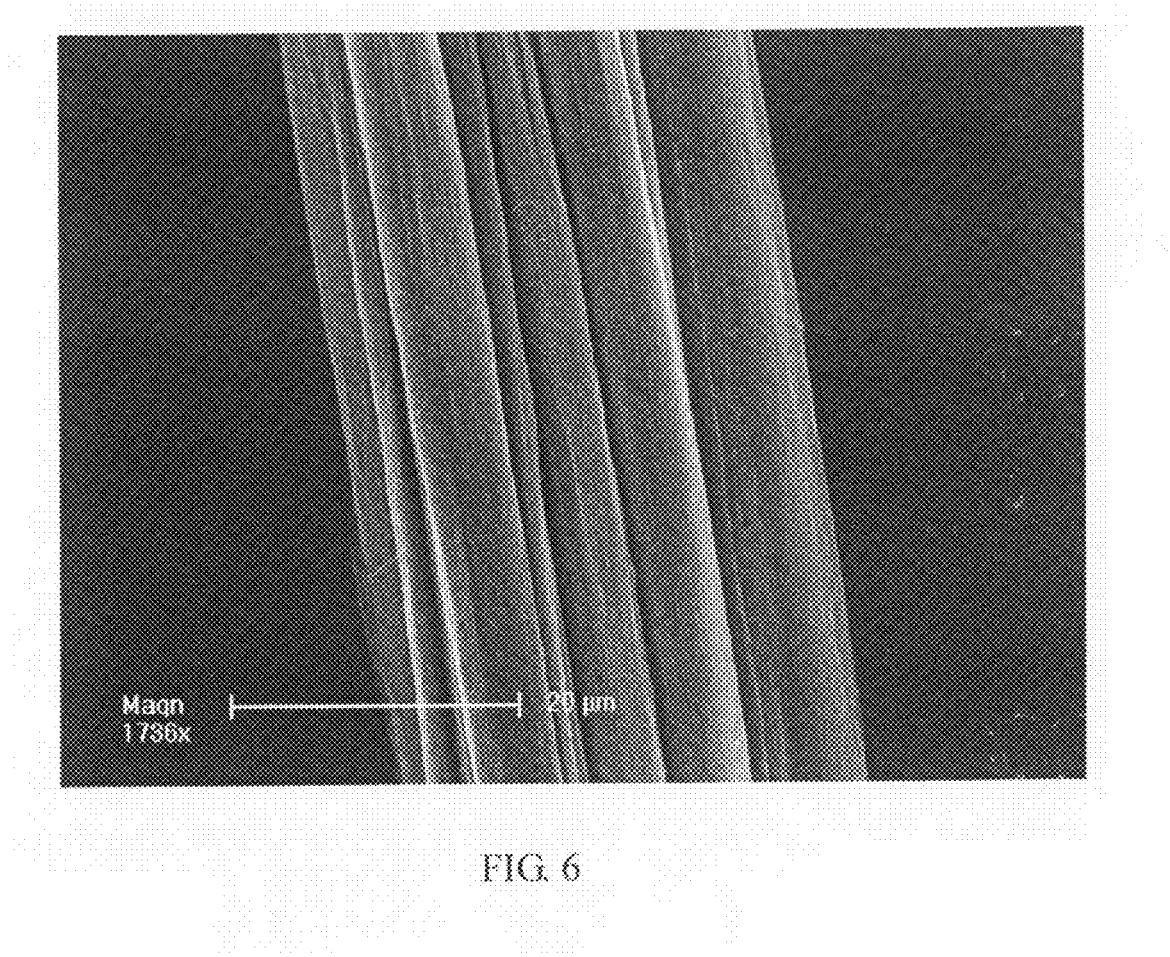
FIG. 6 is a SEM photograph of a carbon nanotube yarn of a preferred embodiment of the present invention.
Figure 7:
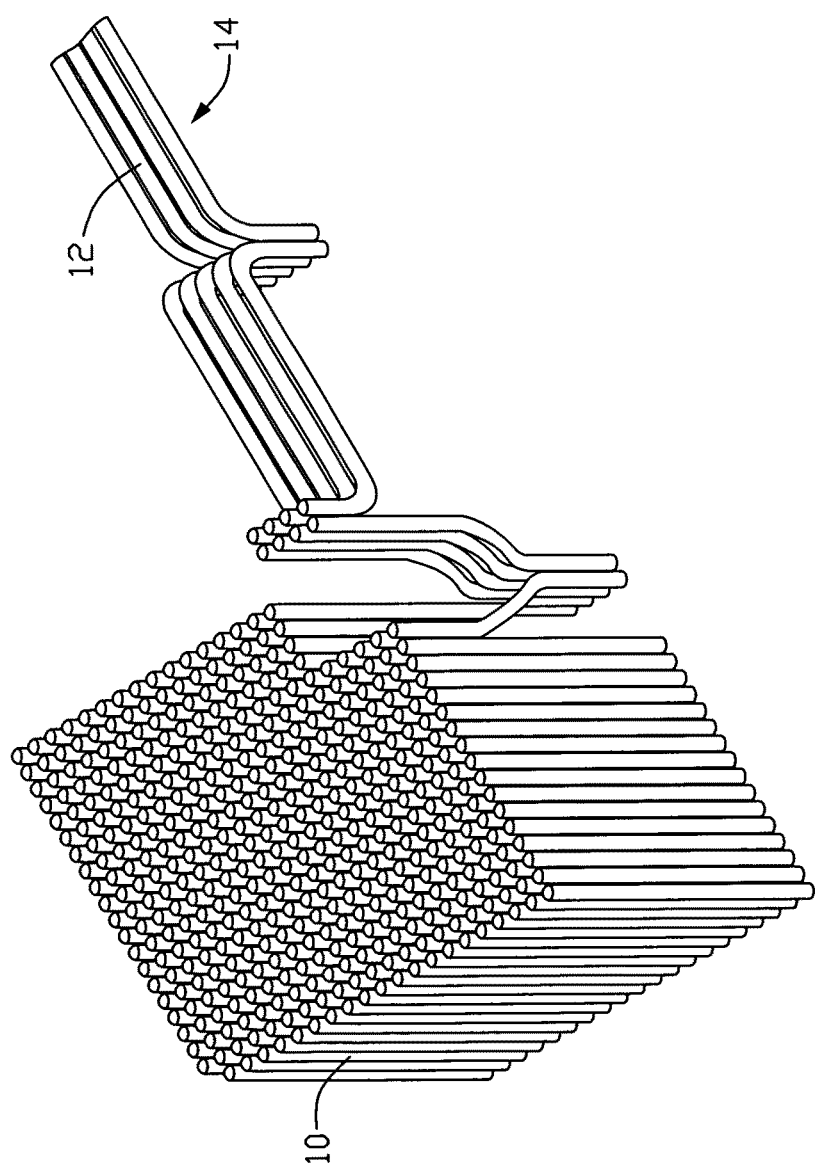
FIG. 7 is schematic view of a conventional carbon nanotube yarn being drawn out from a carbon nanotube array.

In the step (3), referring to FIGS. 1 and 3, a device for continuously soaking the carbon nanotube yarn strings 22 is shown. The device includes a container 40 for containing the organic solvent 50 therein, a tube 42 and a vessel 60 configured for collecting the organic solvent. The tube 42 is coupled to a bottom of the container 40 and is in communication with the container 40. The tube has a through hole 44 defined therein for allowing the carbon nanotube yarn strings 22 to pass therethrough. The container 40 is configured for supplying the organic solvent 50 to the tube 42. A method for soaking the carbon nanotube yarn strings 22 in the organic solvent 50 thereby shrinking the carbon nanotube yarn strings 22 into a single strand of carbon nanotube yarn 30 using above-described device is described below, which includes the steps in no particular order of:

(a) placing the container 40 above the carbon nanotube yarn strings 22, the container 40 containing the organic solvent 50 for treating the carbon nanotube yarn strings 22;

(b) supplying the organic solvent 50 to the tube 42, wherein the organic solvent 50 may be a volatilizable organic solvent such as ethanol, methanol, acetone, dichloroethane or chloroform;

(c) placing the vessel 60 below the through hole 44 of the tube 42 for collecting leaking organic solvent;

(d) passing the carbon nanotube yarn strings 22 through the through hole 44 of the tube 42 continuously to soak the carbon nanotube yarn strings 22 in the organic solvent 50, thereby shrinking the carbon nanotube yarn strings 22 into the carbon nanotube yarn 30 with a diameter of 20~30 microns under the action of surface tension of the organic solvent 50. FIG. 6 shows a SEM photograph of the carbon nanotube yarn 30 of the present embodiment.

Figure 4:
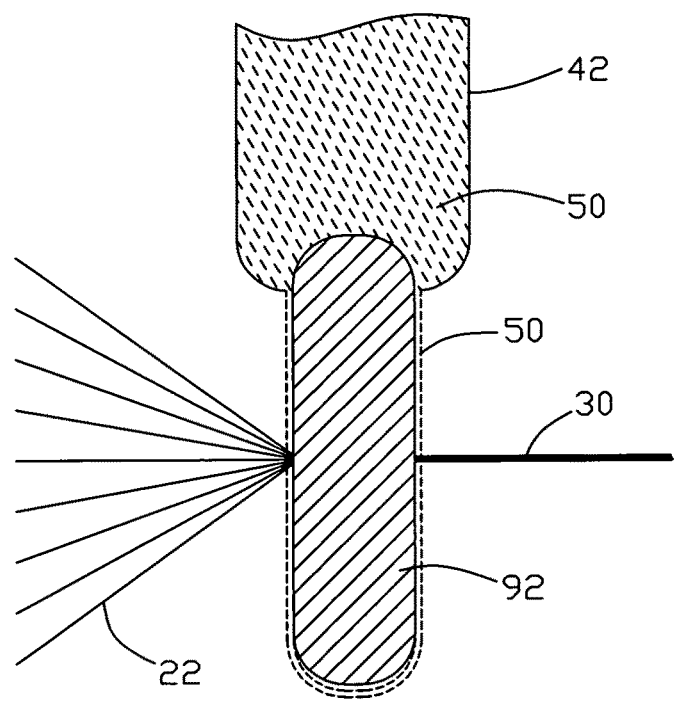
FIG. 4 is an enlarged sectional view of a tube connecting and coupling to a rod.

Alternatively, the tube 42 can have no through hole 44 defined therein, and it can be connected and coupled to a rod. FIG. 4 shows that the tube 42 is connected and coupled to a rod 92. The organic solvent 50 can flow along surface of the rod 92 and the carbon nanotube yarn strings 22 can be attached over or below the rod 92, thereby the carbon nanotube yarn strings 22 shrink into the carbon nanotube yarn 30 due to the surface tension of the organic solvent 50.

Figure 5:
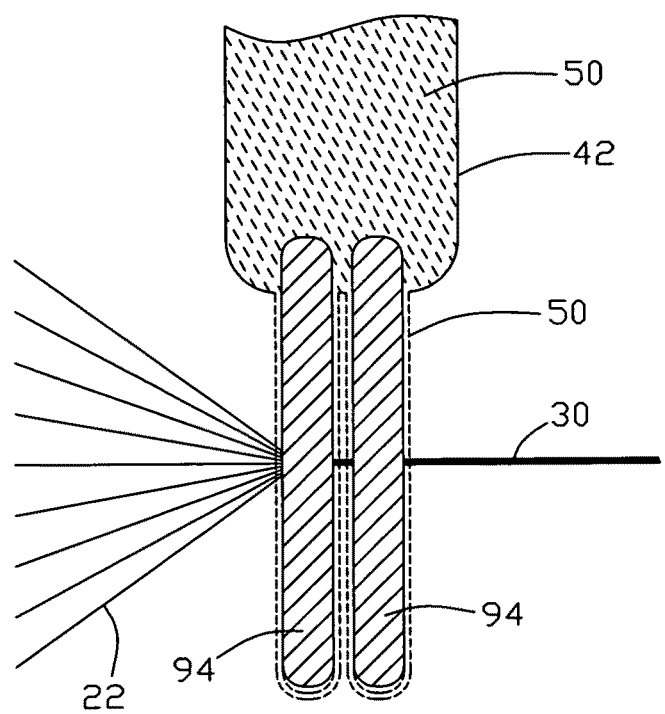
FIG. 5 is an enlarged sectional view of a tube connecting and coupling to two rods.

Of course, the tube 42 can also be connected and coupled to more than one rod, and the more than one rod align together in a parallel form. Referring to FIG. 5, that the tube 42 being connected and coupled to two rods 94 is shown. The organic solvent 50 can flow along surface of the rods 94 and the carbon nanotube yarn strings 22 can be attached over or below the rods 94, thereby the carbon nanotube yarn strings 22 shrink into the carbon nanotube yarn 30 due to the surface tension of the organic solvent 50.

The carbon nanotube yarn 30 includes a number of carbon nanotube yarn strings packed closely together, and each of the carbon nanotube yarn strings includes a number of carbon nanotube bundles which are joined end to end by van der Waals attractive force, and each of the carbon nanotube bundles includes a number of carbon nanotubes substantially parallel to each other. The ratio of surface area to volume of the carbon nanotube yarn 30 is low and the carbon nanotube yarn 30 therefore has non-stick properties.

The carbon nanotube yarn 30 can be coiled onto a bobbin 80 with a electromotor 70 or by hand.

Alternatively, the carbon nanotube yarn strings 22 can be soaked by directly soaking the entire carbon nanotube yarn strings 22 in an organic solvent 50, a shrunk carbon nanotube yarn 30 can be obtained after the soaked carbon nanotube yarn strings 22 are pulled out from the solvent under the action of surface tension of the organic solvent 50. Of course, just one carbon nanotube yarn string drawn out from the carbon nanotube array 20 can be shrunk into a carbon nanotube yarn 30 with above-described steps.

As mentioned above, there is a through hole 44 defined through the tube 42. Referring to FIG. 3, the through hole 44 can be divided into two parts formed in the lateral wall of the tube 42, namely, an inlet 44a and an outlet 44b. When the tube 42 is positioned in the position shown in FIG. 3, the inlet 44a is formed in a left side of the tube 42 and the outlet 44b is formed in a right side of the tube 42. The inlet 44a is capable of accepting one or more carbon nanotube yarn strings 22 and the outlet 44b is capable of accepting the carbon nanotube yarn 30. The inlet 44a is larger than the outlet 44b for converging the carbon nanotube yarn 30 and facilitating the carbon nanotube yarn 30 to go through the tube 42. Further, a converging structure 46 can be located on an outer surface of the tube 42 and has a converging passageway 46a therethrough. The converging passageway 46a is in direct communication with the outlet 44b.

It is to be understood that the above-described embodiments are intended to illustrate rather than limit the invention. Variations may be made to the embodiments without departing from the spirit of the invention as claimed. It is understood that any element of any one embodiment is considered to be disclosed to be incorporated with any other embodiment. The above-described embodiments illustrate the scope of the invention but do not restrict the scope of the invention.

It is also to be understood that above description and the claims drawn to a method may include some indication in reference to certain steps. However, the indication used is only to be viewed for identification purposes and not as a suggestion as to an order for the steps.

We claim:

1. An apparatus for making a carbon nanotube yarn, the apparatus comprising:

a tube comprising of an opening capable of allowing organic solvent into the tube; and an inlet and an outlet defined through lateral walls of the tube; wherein, the inlet is capable of accepting one or more carbon nanotube yarn strings and the outlet is capable of accepting the carbon nanotube yarn; and a bobbin capable of collecting the carbon nantotube yarn as it comes out of the outlet.

2. The apparatus as claimed in claim 1, wherein the inlet and the outlet are located in opposite sides of the tube.

3. The apparatus as claimed in claim 1, wherein the tube further comprises a sealed end, the sealed end and the opening are located on opposite ends of the tube, and the tube is inclined relative to the bobbin.

4. The apparatus as claimed in claim 1, further comprising a container for supplying organic solvent to the tube, the tube is in communication with the container through the opening.

5. The apparatus as claimed in claim 4, wherein the container is at an elevation above the inlet and outlet, and the opening of the tube is located at a junction between the tube and the container.

6. The apparatus as claimed in claim 5, further comprising a vessel positioned at a lower elevation than the inlet and the outlet.

7. The apparatus as claimed in claim 1, wherein the inlet is larger than the outlet.

8. The apparatus as claimed in claim 1, further comprising a converging structure located on the tube, the converging structure having a converging passageway therethrough, and the converging passageway is in direct communication with the outlet.

* * * * *